United States Patent [19]

Whitehead

[11] Patent Number: 5,202,897
[45] Date of Patent: Apr. 13, 1993

[54] FABRY-PEROT MODULATOR

[75] Inventor: Mark Whitehead, Santa Barbara, Calif.

[73] Assignee: British Telecommunications public limited company, London, United Kingdom

[21] Appl. No.: 704,994

[22] Filed: May 24, 1991

[30] Foreign Application Priority Data

May 25, 1990 [GB] United Kingdom ............... 9011813

[51] Int. Cl.$^5$ .............................................. H01S 3/08
[52] U.S. Cl. ..................................... 372/92; 372/43; 372/46; 372/26; 372/29
[58] Field of Search ....................... 372/46, 26, 29, 43, 372/92

[56] References Cited

U.S. PATENT DOCUMENTS 4,546,244 10/1985 Miller ................................... 372/46

FOREIGN PATENT DOCUMENTS

0249645A1 12/1987 European Pat. Off. .

OTHER PUBLICATIONS

Whitehead et al; Modelling the Limits of Low Voltage Operation for the GaAs Multiple Quantum Will Asymmetric Fabry-Perot Cavity Modulator; IEEE Colloquim "Modelling of Optoelectronic devices"; Feb. 1990.
Technical Digest of IEEE Colloquium, "Modelling of optoelectronic devices", Feb. 1990, pp. 8/1-8/4; M. Whitehead et al: Modelling the limits of low voltage operation for the BaAs multiple quantum well asymmetric Fabry-Perot cavity modulator.
IEEE Proceedings, vol. 236, pt. J. No. 1, Feb. 1989, pp. 52-58; W. Whitehead et al: "Investigation of etalon effects in GaAs—AlGaAs multiple quantum well modulators".
IEEE Photonics Technology Letters, vol. 1, No. 9, Sep. 1989, pp. 273-275; R. H. Yan et al: "Electroabsorptive Fabry-Perot reflection modulator with asymmetrics mirrors".
IEEE Photonics Technology Letters, vol. 2, No. 2, Feb. 1990, pp. 118-119; R. H. Yan et al: "Extremely low-voltage Fabry-Perot reflection modulators".
Law et al, "Normally-off high contrast asymmetric Fabry-Perot reflection modulator using Wannier-Stark localization in a superlattice", Appl. Phys. Lett., vol. 56, 19, May 7, 1990 pp. 1886-1888.
Barnes et al, "GaAs/AgAlAs Multiple quantum well optical modulator using multilayer reflector stack grown on Si substrate", Electron, Lett., vol. 25, No. 15, pp. 995-996 Jul. 20, 1989.
Hutchings et al, "Undirectional operation of a ring laser using an absorbing Fabry-Perot filter" Optics Lett., vol. 12, No. 5, pp. 322-324, May 1987.
Smith et al "The demonstration of restoring digital optical logic", Nature, vol. 325, Jan. 1987, pp. 27-31.
Jelley et al, "Experimental determination of electro absorption in GaAs/As$_{0.032}$ Ga$_{0.68}$ of well width", Electron Lett. vol. 24, No. 25, pp. 1555-1557, Dec. 1988.
Yan et al, "Extremely low-voltage Fabry-Perot reflec- (List continued on next page.)

Primary Examiner—Léon Scott, Jr.
Attorney, Agent, or Firm—Nixon & Vanderhye

[57] ABSTRACT

An asymmetric Fabry Perot (FP) modulator includes a quantum well structure having wider (approximately 150 Å) than usual (about 100 Å) wells. The FP cavity has a resonance at a wavelength of an excitonic absorption peak of the QW structure. Although the maximum change in absorption under applied bias is less with 150 Å wells than with 100 Å wells, the characteristics of the electroabsorption are also altered, with the result that the largest change occurs at the wavelength of the band-edge el-hhl exciton at zero bias. Absorption can be reduced by biasing the QW and hence the AFPM can have a normally-off (zero bias, zero reflectivity) characteristic. Such an arrangement makes possible higher contrast modulation and/or lower operating voltages. The FP modulator may be used in SEEDs.

20 Claims, 5 Drawing Sheets

OTHER PUBLICATIONS

Effects in GaAs—AlGaAs Multiple Quantum Well Modulators".
tion Modulators", IEEE Photonics Tech. Lett., vol. 2, No. 2, Feb. 1990 pp. 118-119.
Applied Physics Letters, "Electrodispersive Multiple Quantum Well Modulator", Oct. 1988, pp. 1684-1686; Y. H. Lee et al.
Electronics Letters, vol. 26, No. 19, Sep. 13, 1990, Stevenage GB, pp. 1588-1590; M. Whitehead et al., "Very Low Voltage, Normally-Off Asymmetric Fabry-Perot Reflection Modulator".
Applied Physics Letters, vol. 55, No. 19, Nov. 1989, pp. 1946-1948; R. H. Yan et al., "Wide bandwidth, High-efficiency Reflection Modulators Using an Unbalanced Fabry-Perot Structure".
Applied Physics Letters, vol. 53, No. 11, Sep. 1988, pp. 956-958, M. Whitehead et al., "Effects of Well Width on the Characteristics of GaAs/AlGaAs Multiple Quantum Well Electroabsorption Modulators".
Japanese Journal of Applied Physics, vol. 28, No. 8, Aug. 1989, Tokyo JP, pp. 1523-1524, A. Tomita et al., "Dispersive-Type Optical Bistqability in a Self-Electrooptic-Effect Etalon".
Optical Engineering, vol. 26, No. 5, May 1987, Bellingham US, pp. 368-372, D. A. B. Miller, "Quantum Wells for Optical Information Processing".
IEEE Proceedings, vol. 136, pt. J. No. 1, Feb. 1989, pp. 52-58; W. Whitehead et al.; "Investigation of Etalon

CONVENTION:

IS A REFLECTION MODULATOR INCORPORATING THE ASYMMETRIC STRUCTURE.

GENERAL SEED CONCEPT
— ANY ELECTRONIC OR OPTOELECTRONIC COMPONENT.

SPECIFIC IMPLEMENTATIONS

T-SEED

S-SEED

FABRY-PEROT MODULATOR

RELATED APPLICATION

This application is related to copending commonly assigned U.S. patent application 07/768,223, filed Oct. 15, 1991 (claiming priority from GB 8904185.9, filed Feb. 23, 1989 and PCT/GB90/00282, filed Feb. 22, 1990) naming Mark Whitehead as inventor and entitled "Fabry-Perot Modulator.

BACKGROUND

I. Field of the Invention

This invention relates to Fabry-Perot modulators and in particular, but not exclusively, to those employing a multiple quantum well active region.

II. Prior Art and Other Considerations

Since the first observation of the effect of electric fields on the optical properties of GaAs-AlGaAs quantum well (QW) structures a number of optoelectronic devices have been demonstrated which exploit the enhanced electro-absorptive properties of QW structures, e.g. fast intensity modulators and hybrid optical logic elements, both bistable and non-bistable. These devices employ a QW layer or multiple quantum well (MQW) grown epitaxially as the intrinsic region of a pin diode that can operate as an electro-absorptive modulator and efficient photodetector simultaneously.

A contrast ratio (on:off) of 2:1 has been observed in transmission devices with only 1 $\mu$m of MQW absorber usually consisting of wells and barriers each about 100++ thick. This is very efficient, given the device size, but a better contrast ratio is desirable. By 'contrast ratio' is meant the ratio of the high:low output states, irrespective of whether the device switches on or off with applied bias. 'Modulation depth' is the absolute change in state, which in reflection or transmission terms can only be between 0 and 1.

It might at first seem that in order to obtain better contrast or modulation figures one would simply increase the thickness of the MQW layer. However, the situation is complicated by a variation of the electric field across the intrinsic region of the PIN device which results from the relatively high background doping level of this layer. The background doping level has had a lower limit of $1 \times 10^{15}/cm^3$ in the best available material (this is not a fundamental limit and depends on the material and growth conditions), and is routinely two or three times this value. The resultant significant variation in the electric field causes a broadening of the absorption edge of the MQW material even at zero bias and, moreover, produces a different red shift of the excitonic absorption in each well as an external bias is applied to the device for modulation. As the bias is increased the absorption edge broadening becomes worse due to the roughly parabolic dependence of the edge shift on applied field. So, instead of producing a larger change in the intensity of a transmitted or reflected beam of light the increase in thickness of the absorbing layer might only serve to distribute absorption changes over a wider spectral region and leave the modulation at the operating wavelength relatively unaffected.

Optimisation calculations have shown that if the residual doping is $2 \times 10^{15}/cm^3$ it is best to use about 45 wells of 100 Å GaAs separated by barriers of 100 Å Al$_{0.3}$Ga$_{0.7}$As confirming the limit of around 1 $\mu$m for the total thickness.

A second disadvantage of increasing the MQW thickness is that an increased voltage is required to induce a given change in absorption. It has been proposed that QW devices be integrated in 2-dimensional arrays with Si-based LSI electronics to form high-bandwidth optical interconnects, and in this case drive voltages for such modulators or logic gates will be limited to a few volts.

One method of improving modulation in a device that has limitations on its absorber thickness and drive voltage is to increase the effective optical path length by incorporating the MQW pin diode into a Fabry-Perot etalon.

Asymmetric Fabry-Perot modulators (AFPMs) containing quantum wells have recently been demonstrated, which exhibit contrasts of 13-20 dB in reflection with low insertion loss and 9-10V bias (2,3). In this case the front and back cavity mirrors are formed by the air/semiconductor interface (R0.3) and an integrated semiconductor multiple quarter-wave stack (R>0.95) respectively. The enhanced modulation is achieved by using the attenuating effect of MQW electro-absorption at a resonant wavelength of the Fabry-Perot cavity in order to match front and effective back mirror reflectivities, at which point the net cavity reflection must fall to zero. Devices of this type can be readily made in planar arrays with low coupling losses, and are therefore of considerable interest as interface elements for optical interconnects.

Compatibility of the modulator voltage swing with that directly attainable in high-speed electronic circuits (5V or less) is clearly desirable. To achieve these lower drive voltages, a number of options are available. Firstly, the number of wells can be reduced. Recent calculations have indicated than an AFPM containing 31$\times$(100 Å GaAs well+60 Å Al$_{0.3}$Ga$_{0.7}$As barrier) should achieve a peak contrast of 10 dB at only 3.3V bias (4).

Secondly, if the cavity finesse is increased by integrating a front mirror of higher reflectivity than the usual 0.30, the critical amount of absorption required for the zero off state is reduced (5). This option has recently been demonstrated by Yan et al. (6), who achieved over 7 dB contrast with only 2V bias. A disadvantage is that the increase in finesse leads to reduced optical bandwidth and higher insertion losses for a given background absorption, along with increased sensitivity to temperature and cavity thickness fluctuations.

SUMMARY

We have realized that there is a third approach by means of which operating voltage requirements can be reduced or the contrast ratio for a given operating voltage increased.

According to a first aspect the present invention provides a Fabry-Perot modulator comprising a resonant cavity defined by front and back reflective surfaces of different reflectivities and including within the cavity a multiple quantum well structure in which the barrier width is sufficient to prevent resonant coupling between the wells in the structure, wherein the absorption of the quantum well structure at a resonant wavelength of the cavity and at a low bias level is greater than with a higher bias level, whereby the reflectivity of the Fabry-Perot modulator at that wavelength increases with an increase in bias level.

With such an arrangement it is possible to have a very low (near-zero) cavity reflectivity at low bias and obtain significant reflectivities with relatively modest bias levels. And because the 'off' state is so low, very large contrast ratios (100:1) are achievable. Alternatively, one can obtain normal (say 3:1 to 5:1) contrast ratios with lower than usual bias levels.

Preferably substantially all of the barrier layers in the MQW structure are at least 40 Å thick.

Preferably the MQW comprises a plurality of wells having a width of between 130 and 160 Å. More preferably the well width is at least 140 Å. Most preferably the well width is at least 145 Å.

Preferably the MQW comprises barrier layers having widths of between 40 and 100 Å. More preferably the barrier width is no more than 70 Å. Most preferably the barrier width is between 45 and 65 Å.

Preferably the MQW structure comprises no more than 30 wells. More preferably the MQW has between 10 and 30 wells.

In the letter by K. K. Law et al., published in Appl. Phys. Lett. 56(19), 7 May 1990, 1886–1888, there is described a normally-off AFPM which utilizes the Wannier-Stark localization in a superlattice (SL). (A superlattice structure is distinct from an MQW structure because the barriers in a superlattice are thin enough for there to be substantial resonant coupling between adjacent wells. In an MQW structure the barriers should be of a thickness sufficient to ensure that the wells remain quantum mechanically isolated. Law et al used a superlattice consisting of 100 half pairs of 30 Å GaAs/30 Å $Al_{0.7}Ga_{0.3}As$). When an electric field is applied along the growth direction of an SL, the resonant coupling between the QWs of the SL is destroyed because the energy levels in adjacent QWs become misaligned and the eigenfuctions localize over a few adjacent QWs. This is called Wannier-Stark localization and gives rise to a change of absorption edge from that of a miniband profile to a sharp QW excitonic shape. Associated with the wave function localization, there is an effective blue shift of the absorption edge because the SL band gap is smaller than that of the isolated QW level. Conventional QWs of course give a red shift when a field is applied. Law et al report that, at higher applied fields, the initially observed blue shift becomes a red shift (with an applied voltage of 6 volts or more) as the result of competition between the blue shift due to Wannier-Stark localization and the red shift corresponding to the combination of the quantum confined Stark effect due to the field-induced deformation of the QW potential and of the enhancement of the exciton binding energy caused by the localization. Law et al report that for a voltage swing of 8 volts, the reflectivity at the zero-bias FP resonance wavelength was seen to increase from ~0.4% to ~25%, equivalent to a contrast ratio of 62.5:1. Law et al also mention that the contrast ratio varies rapidly as a function of wavelength, but that with an applied bias of 8 volts a contrast ratio greater than 10 can be attained over an optical bandwidth of 25 Å, somewhat smaller than that of a normally-on device reported by Yan et al. (Photon. Tech. Lett. 2, 118,1990). It is not clear how the performance of devices of the type described by Law could be improved.

The present invention provides a device structure which would appear to offer performance better than that of comparable devices of the type described by Law. In particular, devices according to the invention potentially offer lower bias and lower insertion losses for a given contrast ratio.

BRIEF DESCRIPTION OF THE DRAWINGS

Preferred embodiments of the invention will now be described, by way of example only, with reference to the accompanying drawings in which.

DETAILED DESCRIPTION OF THE DRAWINGS

Figure 2:
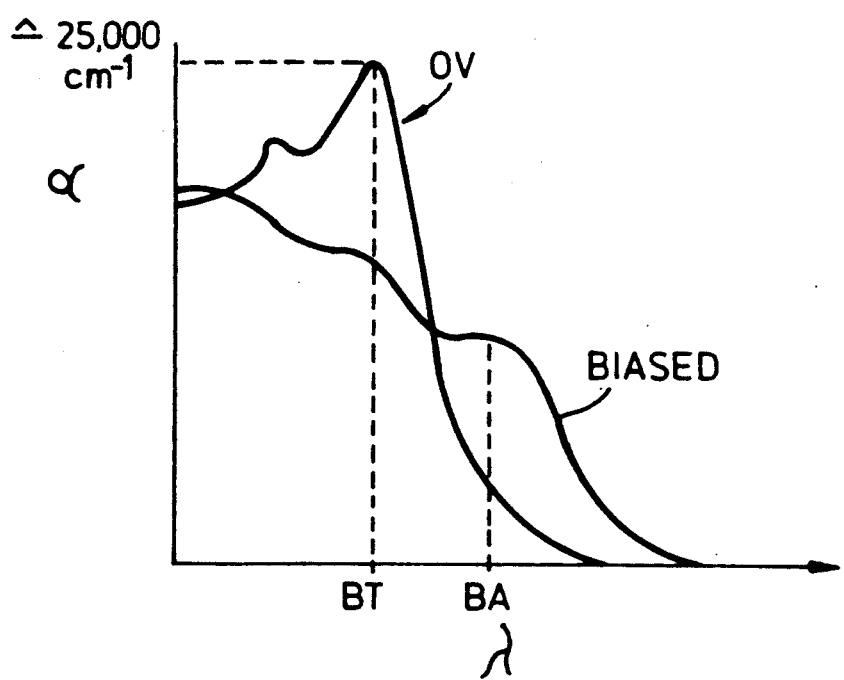
FIG. 2 shows schematically the corresponding behaviour of a 'conventional' QW structure.

In our co-pending PCT patent application (GB90/00282) we describe and claim an asymmetric Fabry-Perot QW modulator (AFPQWM) in which the QW structure has in the unbiased-state a low-absorption at a resonant frequency of the FP cavity. By applying a bias to such a device, absorption in the QW is increased and hence the reflectivity of the modulator is reduced. In FIG. 2 absorption is plotted against wavelength for such a QW structure (which will typically have a well width of 100 Å) for two bias levels. The optimum wavelength of operation of such a structure in an AFPQWM of the type described in GB90/00282 is shown at point BA (Bias Absorbing). Such a QW structure is combined with a Fabry-Perot cavity, the properties of the QW structure and the resonance frequency of the cavity being chosen such that a Fabry-Perot resonance coincides with a low initial absorbing state in the unbiased QW at a wavelength at which a relatively highly absorbing state is available in a biased condition.

Figure 1:
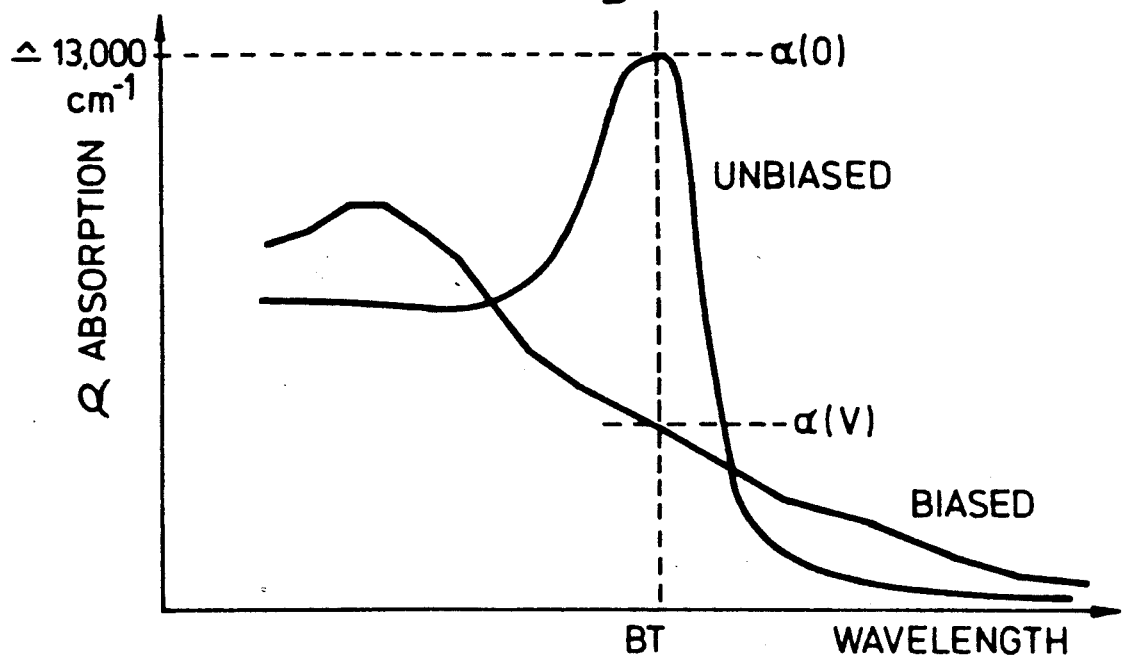
FIG. 1 shows schematically for a 'wide' QW structure the absorption against wavelength in the biased and unbiased states.

In FIG. 1 there is shown an equivalent plot for a QW structure, which, if made from the same materials as the device whose behaviour is illustrated in FIG. 2, has a greater well width. Typically, if the wells of both devices were made of GaAs and the barriers of $Al_{0.3}Ga_{0.7}As$, the well width for FIG. 1 behaviour would be 145–150 Å, while for FIG. 2 the width would be 100 Å. In FIG. 1 the wavelength corresponding to the peak of the absorption in the unbiased state is marked BT, to signify the optimum bias transmitting point.

The differences between the absorption profiles represented in FIGS. 1 and 2 are significant. In devices according to the invention we take advantage of the fact that in QW structures having absorption profiles such as that shown in FIG. 1, which we will here refer to as the 'wide-well' case, most of the absorption change between the biased and unbiased situation occurs at the absorption peak shown, and rather poor changes at the wings of the profile. Put another way, with structures of this type, the biggest absorption change occurs at the wavelength at which, in the unbiased state, absorption is strongest. Furthermore, the wide-well structures are more sensitive to electric fields than the narrow well samples (ref. Whitehead et al, Appl. Phys. Lett. (1988), 53, 956-8).

With this in mind, we choose QW structures which have a high initial (i.e. unbiased) absorption, and then arrange to bias the device to reduce its absorption and hence increase the reflectivity of the Fabry-Perot modulator. In practice, some absorption remains in the biased state, and this residual absorption limits the amount of reflectivity that one can obtain from a Fabry-Perot modulator of this type. Our calculations indicate that it is possible to achieve, at room temperature, reflectivities of up to 25 to 30 percent and yet still provide a near-zero reflectivity in the unbiased state.

For QW structures of the type whose absorption spectrum is illustrated in FIG. 2, typically GaAs/GaAlAs structured with wells 80 to 110 Å wide, there is a well defined absorption peak both in the unbiased and the biased state. The peak remains well resolved in the shifted form and it is possible to obtain a strong modulation effect by operating close to the absorption edge (as described in GB90/00282 for a normally-on device). However, for a normally-off device, i.e. one where there is low reflectivity/high absorption in the unbiased state, the level of absorption in the 'one state' is too high. Note the relative scales of FIGS. 1 and 2. The absorption peak in FIG. 1 is about 1300 $cm^{-1}$, while in FIG. 2 it is roughly twice as high.

The peak in the unbiased absorption spectrum in FIG. 1 corresponds to the el-hhl exciton peak. It is this exciton peak that we arrange to coincide, under low electric field conditions, with a resonance of the asymmetric FP cavity, to give low cavity reflection—the "off" state. On applying an electric field, the exciton shifts and loses oscillator strength rapidly, and the cavity reflection increases as the absorption falls. With 150 Å wells of GaAs with 60 Å AlGaAs barriers, the critical absorption for effectively zero reflectivity is achieved with about 30 wells, in which case the theoretical contrast is more than 30 dB with about 6 dB insertion loss. These figures are obtained for a voltage swing of just over 5 volts.

Figure 3:
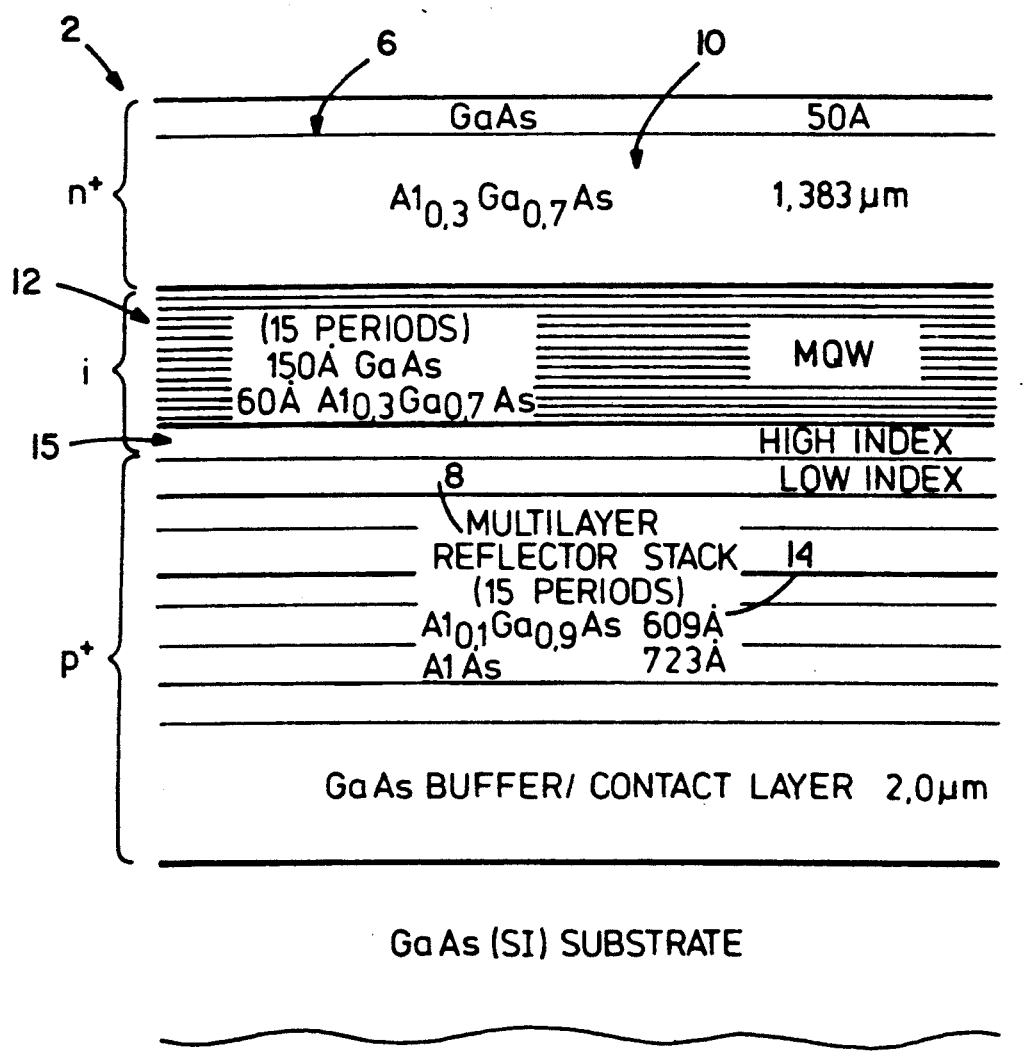
FIG. 3 shows a schematic vertical section through a device according to the invention.

In FIG. 3 there is shown a Fabry-Perot modulator 2 comprising a resonant cavity 4 defined by a front reflective surface 6, of reflectivity $R_1$, which may be formed by the natural semiconductor surface or by a reflective coating thereon, and a back reflective surface 8, of reflectivity $R_b$. The cavity is formed of the front, AlGaAs, region 10, which in this example is $n^+$, and the intrinsic, quantum well region 12 which comprises 150 Å GaAs well regions separated by 60 Å $Al_{0.3}Ga_{0.7}As$ barriers. The total thickness of regions 10 and 12 is intended, in this example, to be such that resonance occurs at 862 nm—which is the wavelength of the el-hhl exciton for 150 Å quantum wells at low field. An optional 50 Å capping layer of GaAs which overlies the AlGaAs region 10 is intended for contacting purposes and is thin enough to have a negligible absorptive effect on the light passing through it.

The multilayer stack reflector 14, which serves as the back reflector of the cavity, is a 15 period stack which comprises alternating layers of $Al_{0.1}Ga_{0.9}As$ and AlAs. The ternary layers of the stack 14 are 609 Å thick, the binary layers 723 Å. The uppermost layer of the stack 15, which is the one in contact with the MQW region 12, is formed of the high index material. This topmost layer of the reflector stack 15 is preferably left undoped in order to guard against possible upward dopant diffusion into the MQW structure.

The multilayer reflector stack, and others like it, have been shown (2) to give reflectivities of 0.95 or more. Different reflector stacks can be used, reflectivity depending upon the refractive index difference between the component layers of the stack and upon the number of layers: in general fewer periods will lower the reflectivity, while more will tend to increase it.

The absorption coefficient of the MQW device can be altered by the application of a bias voltage in a known manner. The resonant MQW etalon modulator of FIG. 1 was modelled in a simple way, with more emphasis on the electric field-induced absorption and refractive index changes (although the index changes, which are generally negligible even for standard 100 Å AFPM devices, are even smaller for the wide-well devices) in the MQW layer and the manner in which they combine with the properties of the basic resonant cavity, rather than considering in detail the subtleties of the multiple layers which may make up the cavity. For example, we have avoided multiple matrix-type calculations required to simulate the spectral reflectivity properties of dielectric stack mirrors. The main approximations made are (a) Spectral dispersion and spatial variation of the zero-bias cavity refractive index are ignored. By 'spatial variation' we refer to the index of the different layers of GaAs and AlGaAs that may make up the cavity. A weighted mean index $n_m$ of 3.37 was calculated for the cavity at 850 nm, based on the effective AlGaAs content of a typical MQW pin structure and published experimental index data for this material and this was kept constant throughout. The justification for this is that in the small wavelength band which would be considered for device operation the spectral variation of the refractive index is so small that it has no significant effect on the modulation characteristics. Furthermore, as long as the calculated mean index lies somewhere between that of GaAs and AlGaAs at the operating wavelength, there is no effect on the magnitude of the modulation achievable with a cavity of given finesse. The effect of the change in index induced by an applied electric field is a much more important consideration.

(b) The cavity mirrors are assumed to be 'hard' reflectors, i.e. we ignore the finite thickness of the mirrors which would be used in a practical device, and assume all reflections to occur at the interfaces between the cavity material and the mirrors. These would probably consist of multiple quarter-wavelengths of dielectrics of different refractive indices (when high finesse is required), plasma-deposited (in the case of dielectrics) and could either be evaporated or epitaxially integrated, perhaps as the p and n regions of the pin structure. The specific details of how the front and back surface reflectivities are achieved are not critical to the calculations of the optimum device modulation properties.

(c) We have not included the linear electro-optic (LEO) effect, which we would expect to become comparable to the electro-refractive effect only at longer wavelengths, outside the region considered here. The polarisation dependence of the LEO contribution to modulation has recently been observed in a high-finesse device.

The cavity length of the FIG. 3 arrangement is L, and is set at a value around 1.7 μm, which places the F-P resonance in the wavelength region of interest and is also in keeping with typical epitaxial structure thicknesses. The cavity length includes the thickness of all MQW layers and the thickness of the n+Al₃Ga₇As layer. The use of a cavity length of an odd integral number of quarter wavelengths is necessary because it places the F-P resonance at the desired wavelength. When the FIG. 3 structure is modelled using full multi-layer matrix calculation methods we find that in the case of the high finesse device (which would have another multilayer stack on top instead of the simple AlGaAs layer) the cavity thickness (length) L is defined only by the MQW thickness i.e. the MQW/MLS boundary defines the mirror reflection point. In this case the cavity thickness, L, must indeed be an integer number of $\frac{1}{2}$ wavelengths (the operating wavelength). However, when modelling the asymmetric structure, the cavity is more probably defined by the total thickness of the MQW+AlGaAs top layer, and in this case, to put the F.P. resonance at the required wavelength, L must be an odd integral number of quarter wavelengths. (Whether one makes the "cavity" $m\lambda - \frac{1}{2}$ with m even, or $m\lambda/4$ with m odd, depends on whether the top layers of the MLS is low index or high index respectively. The mirror will be highly reflecting for both cases.) Because of the symmetry the cavity is subtly different from the high-finesse case, but the observation above has been confirmed by other workers with access to multi-layer simulation programs. For a cavity such as the one in FIG. 3, with a mean refractive index $n_m$ and linear absorption $\alpha$ (in the MQW region only), in the planeware approximation at normal incidence, the transmission T and reflection R are given by the following equations:

$$T = \frac{A}{(1 + F \sin^2 \phi)}$$

$$R = \frac{(B + F \sin^2 \phi)}{(1 + F \sin^2 \phi)} \text{ where}$$

$$F = \frac{4R_a}{(1 - R_a)^2}$$

$$A = e^{-\alpha d} \frac{(1 - R_f)(1 - R_b)}{(1 - R_a)^2}$$

$$B = R_f (1 - R_{60}/R_f)^7/(1 - R_a)^2$$

and $$R_a = (R_f R_b) e^{-\alpha d} \phi = 2\pi n_m L/\lambda$$

Cavity finesse $=(\pi/2) F^{\frac{1}{2}}$ where $R_f$ is the reflectivity of the front surface, $R_b$ the reflectivity of the back reflector, d is the thickness of the MQW layer, $\alpha$ the absorption at wavelength $\lambda$, L the cavity length and $n_m$ the average refractive index.

The data used for modelling were derived from room temperature transmission spectra, which are in reference 7, over the range 800-920 nm. By performing a Kramers-Krönig integral on this data we have obtained the corresponding spectra for electro-refraction. Because of the minimal changes in absorption outside the wavelength range 810 -900 nm, we set these as the limits for the Kramers-Krönig integral. These spectra actually take into account possible contributions from the field-induced 'forbidden' transitions which occur above the MQW absorption edge at energies below the n=2 sub-band edge and which begin to dominate the absorption spectra at high applied fields.

If we choose the cavity length so that a reflection resonance occurs at or about a peak, such as the el-hhl exciton peak, of the unbiased MQW absorption spectrum, where $\alpha$ is initially high, then the resonant reflection must remain low. The condition to achieve precisely zero reflectivity is:

$$\alpha d = 0.5 \ln (R_b R_f) \tag{1}$$

which, for our chosen reflectivities, means that $\alpha d = 0.58$. The electro-absorptive properties of the MQW can then be used to tune the cavity so that R becomes as large as possible. We estimate that the absorption coefficient at the exciton peak can be reduced from about 13000 cm$^{-1}$ to a minimum of about 4000 cm$^{-1}$ by applying a field of about 86 kV/cm (which gives a total field of 100 kV/cm, since there is always a built in field of 1.3V) for the wide-well sample. The optimum operating wavelength is selected automatically in our calculation scheme to give the maximum contrast for a given upper limit on the insertion loss. Having found the optimum wavelength, the cavity length is set so as to put the cavity resonance at the wavelength.

Figure 6:
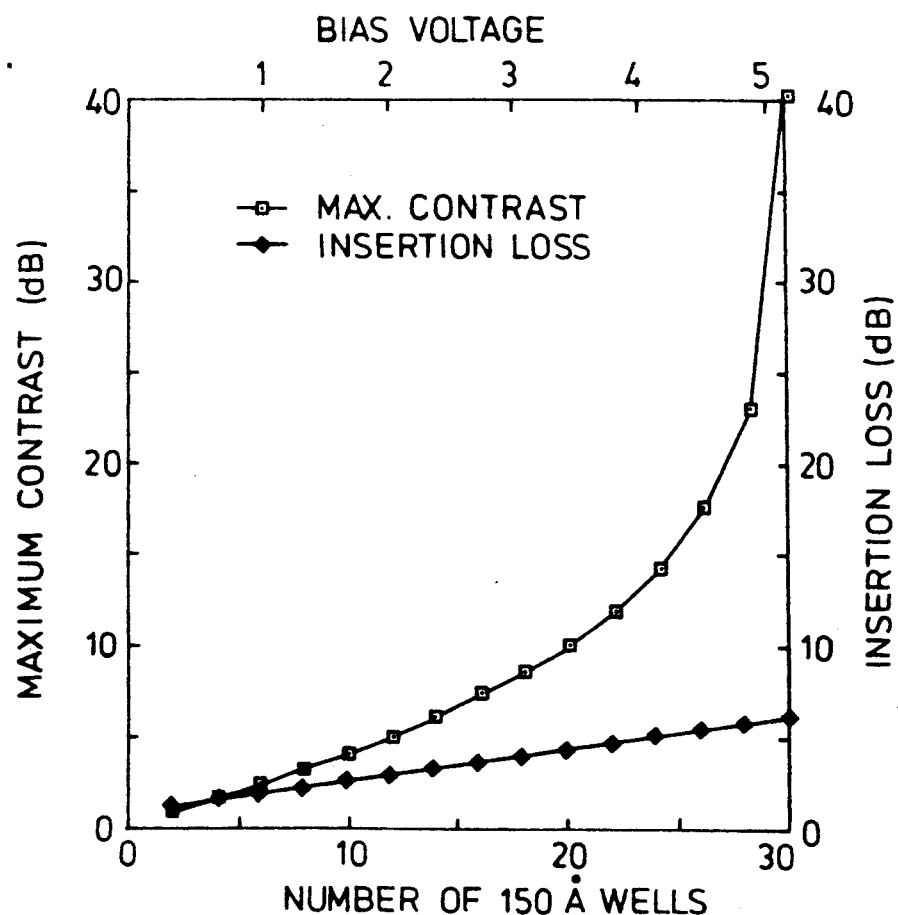
FIG. 6 is a graph showing calculated maximum contrast and insertion loss (at resonance) as a function of the number of 150 Å wells in an AFPM.

In FIG. 6 there is shown the calculated maximum contrast and insertion loss (at resonance) as a function of the number of 150 Å wells in an AFPM. The critical absorption for zero reflectivity is achieved with about 30 wells, in which case the theoretical contrast is more than 30 dB with only about 6 dB insertion loss. These figures are for a voltage swing of just over 5 volts, calculated by assuming that the average field of about 86 kV/cm exists only across the MQW region, which in this example has 60 Å barriers of Al$_{0.3}$Ga$_{0.7}$As. If one is interested in operation at even lower voltages, one can use fewer wells and still obtain reasonable contrast. For example, a structure containing only 15 of the above wells should provide a peak contrast of about 7 dB, with only about 3 dB insertion loss, and with a voltage swing of only 2.6 volts. Even fewer wells may be used where this is appropriate, or an intermediate number of wells may be used to obtain properties intermediate those set out above.

A structure containing 15 wells as described above was grown using a conventional MOVPE growth technique. Prior to device fabrication the wafer was scanned at normal incidence, using an optical multi-channel analyser, in order to determine the areas with the most suitable reflection characteristics (correct cavity thickness). Simple mesa diodes (500 μm×500 μm) with windowed top contacts were fabricated from selected regions using standard photolithography, metallization and wet chemical etching. Devices were mounted and wire-bonded onto TO5 headers for biased reflectivity measurements. All reflection spectra were measured at normal incidence and room temperature using a computer-controlled scanning monochromator system, with lock-in detection for the reflected signal. These spectra were then normalized to that from a freshly-deposited Au film.

Figure 4:
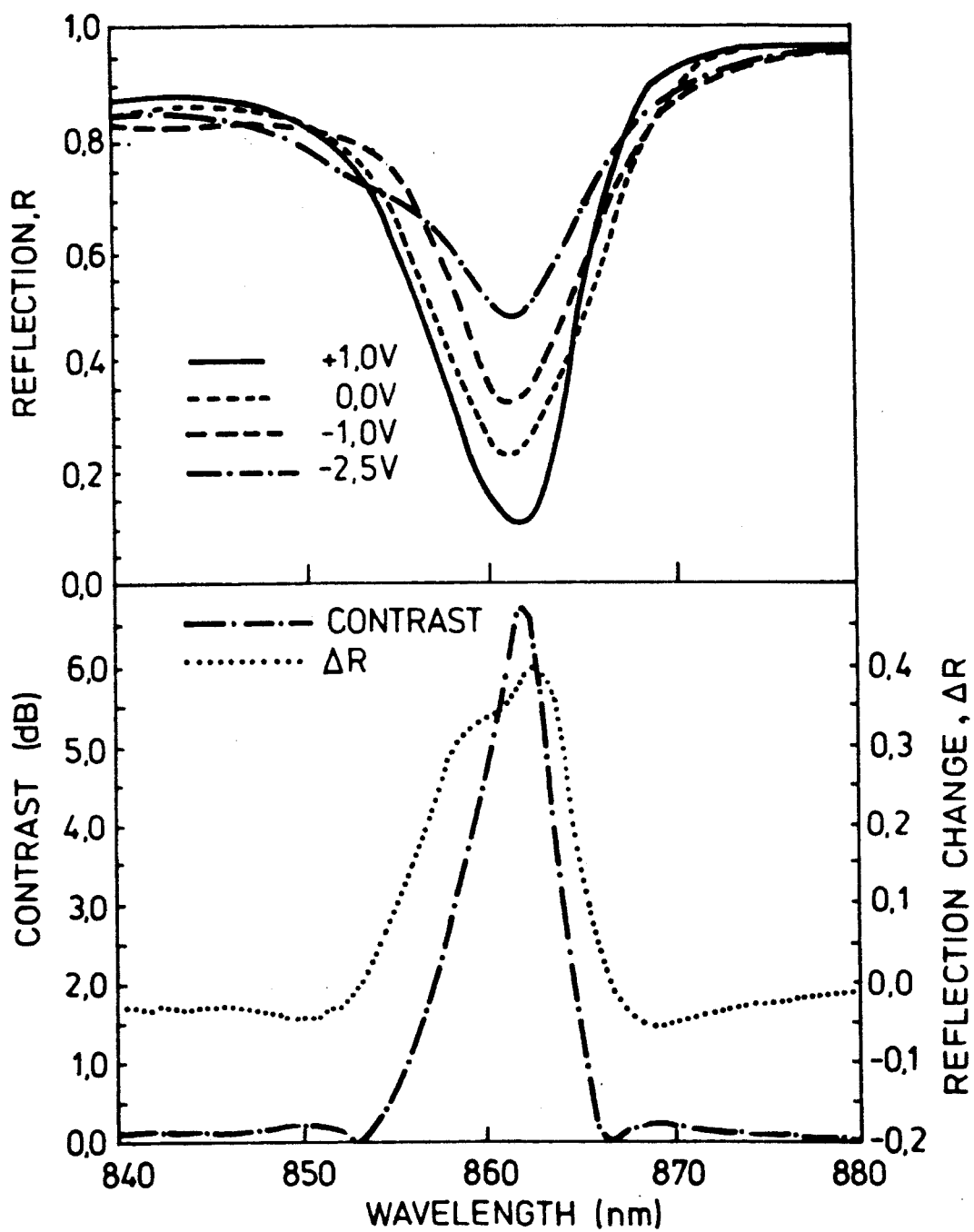
FIG. 4 shows reflection, reflection contrast and reflection changes for a device according to the invention.
Figure 5:
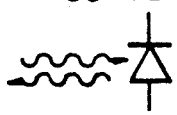
FIG. 5 shows schematically a SEED according to the present invention.
Figure 5:
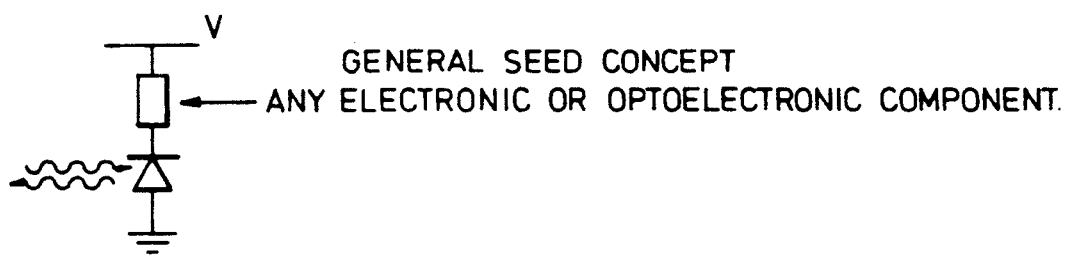
Figure 5:
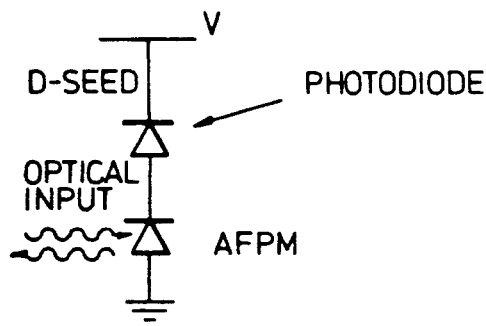
Figure 5:
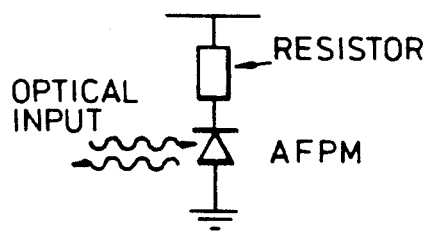
Figure 5:
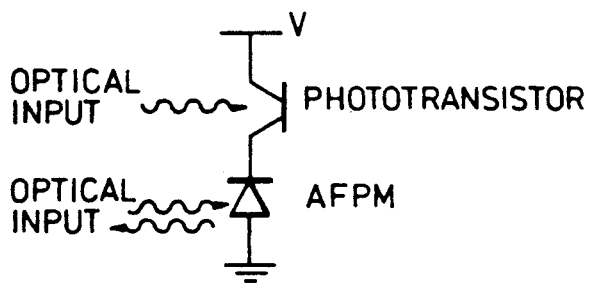
Figure 5:
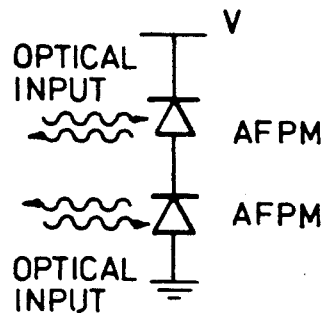
Figure 5B:
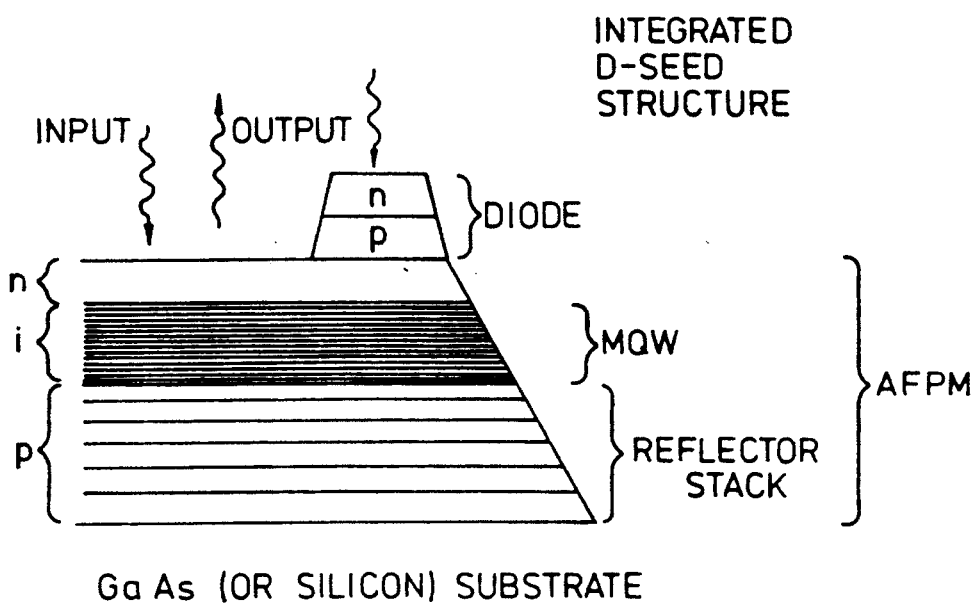
FIG. 5b shows schematically an integrated D-SEED according to the present invention.

FIG. 4 shows the behaviour of the 150 Å well AFPM with various applied voltage. The operation is as expected—the resonant reflectivity increases with increasing field, and with a fairly broad bandwidth. We find that to achieve the lowest off-state the device must be forward biased so as to offset the built-in field, estimated to be 50 kV/cm for such a thin MQW region, and restore the absorption at the exciton peak. There is excellent agreement between theory and experiment for the maximum contrast, which we fine to be 6.7 dB (4.7:1) for a voltage swing of 3.5V. This voltage is a little higher than expected, but is almost totally due to the undoped $Al_{0.1}Ga_{0.9}As$ layer in the i-region. Peak insertion loss is only 3.2 dB. The optical bandwidth for 3 dB contrast is $\simeq 6$ nm, which is also the bandwidth over which %R is at least 0.3. It is also worth noting that the device is capable of >3 dB contrast with a swing of only 1V(+1V to 0V), albeit with a higher insertion loss ($\simeq 6$ dB). An interesting feature of the normally-off AFPM operation is its compatibility with the characteristics required for a self-electro-optic effect device (SEED) (9). The absorption and photocurrent both fall with increasing applied field at resonance, and the active (MQW) region is thin enough that photodetection efficiency remains very high even into forward bias.

The AFPM structure incorporating wide wells and operating in a normally-off mode can be used for very low voltage modulation. Devices such as these may be important for high speed optical interconnection of electronic circuits and for high contrast SEED elements and arrays.

There are two conflicting considerations for the barrier layer thickness. First, the barrier layers need to be sufficiently thick for the wells to remain quantum mechanically isolated. If the barrier layers are thinner than this, the structure will lose the essential nature of a quantum well and will instead act merely as a superlattice (which do not have such good) electro-absorption characteristics). On the other hand, one wants to minimise the barrier layer thickness in order to minimise the necessary bias voltage of the device. The barrier layers themselves make no useful contribution to the device's optical absorption. Preferably, therefore, the maximum barrier thickness is no more than 100 Å. In view of the desire to use a low operating voltage, barrier thicknesses are preferably less than 100 Å, for example less than 90 Å, more preferably less than 80 Å, yet more preferably less than 70 Å. Others have reported, in other contexts, the successful use of barrier layers as thin as 40 Å, and we see no reason why such barrier layers should not be used in structures and devices according to the invention. Thus barriers having thicknesses in the range 40 Å to 100 Å are of interest, preferably in the range 40 Å to 80 Å, more preferably 40 Å to 70 Å and most preferably 45 Å to 65 Å. Typically we use barrier thicknesses in the range 50 Å to 60 Å.

In combination with barriers having widths in the ranges set out in the preceding paragraph, we have used wells having widths of about 150 Å.

The choice of well width determines the change in absorption which is achievable at the operating wavelength for a particular swing in bias voltage. For devices according to the invention, one needs a structure in which the level of absorption in the biased state is low enough to give a satisfactory reflectivity in that biased state while also having a high enough absorption in the unbiased state to give a very low reflectivity. Thus it is not enough merely to find a large or relatively large %α. After extensive study of the absorption characteristics of quantum well structures, we favour the use of well widths in the range 145 Å to 150 Å because they have particularly suitable absorption characteristics. Well widths outside this range, for example 140 Å to 155 Å, may be used but will not normally offer such a good combination of characteristics. Well widths outside this latter range are not recommended, since they are predicted to have still less desirable characteristics. Well widths much above 150 Å, for example above 160 Å, will result in an almost bulk GaAs property, with the consequent inferior electroabsorption properties. Conversely, use of well widths below 130 Å will give higher absolute absorption figures but with the disadvantage of undesirably high absorption in the biased state.

The two preceding paragraphs should be read in conjunction. In particular, the ranges and preferred ranges for the well and barrier width should be considered together—the most preferred structures being those with barrier widths in the range 50 Å to 60 Å with well widths in the range 145 Å to 150 Å. Preferred structures include any combination of barrier and well widths from any of the preferred ranges.

The barrier and well thicknesses and combinations set out in the preceding paragraphs are appropriate for QW structures comprising GaAs wells and $Al_xGa_{1-x}As$ barriers, the barriers typically having an aluminium mole fraction near x=0.3. However, the invention is in principle applicable to other materials systems—provided that QW structures made from such materials systems have suitable absorption spectra. A 'suitable' absorption spectrum will normally contain an excitonic peak in the unbiased or low biased state, which peak is made coincident with a resonance of the FP cavity, and which peak can be "biased-out" to a desired change in absorption.

Structures according to the invention also find application in self electro-optic devices (SEED). Conventional SEED structures use optically non resonant structures—see for example the chapter (Chapter 14) by Chemla and Miller in "Heterojunction Band Discontinuities—physics and device applications", published by North-Holland, 1987, and the reference thereto. In general the SEED is an optical switch which consists of a QW Modulator connected in series (electrically) with another electronic or optoelectronic device. An I(V) relationships will relate the current through and voltage across the series device. Because the p-i-n QW structure of the SEED also acts as a closely coupled detector/modulator, the current and voltage are also related by the response function of the SEED—which depends upon $\lambda$ and Pin, where Pin and $\lambda$ are the power and wavelength of the light incident on the device, respectively. These two relations have to be satisfied simultaneously and this gives rise to the possibility of electronic feedback on the optical behaviour. The feedback can be positive or negative, depending upon the operating wavelength. Both types of feedback have been exploited in optically bistable devices, self-linearized modulators and optical level shifters. While such devices have been demonstrated both in the propagation mode normal to the QW and in a waveguide orientation, the applicability of structures according to the present invention as SEEDs appears to be limited to devices in which the propagation mode is normal to the layers of the QW.

AFPMs according to the invention, that is those whose reflectivity is very low in the unbiased state due to the coincidence or near coincidence of a peak in the unbiased absorption with a resonance of the FP cavity, can simply replace the QW structures of known SEED structures. The benefit of replacing the non-resonant reflection mode QW structures of known SEEDs with those according to the present invention is that it provides a means of improving the contrast ratio of the SEED. Typically, prior art SEED switches have on-/off ratios of about 3:1.

It is worth noting, in this context, that although SEEDs according to the present invention are resonant structures, their linewidth is no narrower than the excitonic feature that one is using. In fact, in general, the device's linewidth is slightly wider than the excitonic feature.

As with other SEED structures, SEEDs according to the invention are temperature sensitive. Because satisfactory operation of the device depends upon the relationship between the FP resonance and the absorption feature, features which move with temperature, but at different rates, SEEDs and the other devices according to the invention will need a controlled-temperature operating environment. The absorption edge shifts by about 1 nm for every 3 Kelvin. Normally, an operating range of 10° C. will be possible. Such a range is comparable to that required by "ordinary" QW modulators. Typically one or more Peltier coolers will be used to control device temperature.

In the embodiments described above, the Fabry-Perot cavity has been defined by various surfaces of the semiconductor structure; this is not an essential feature of the devices. The quantum well structure and one or both of the reflectors defining the cavity could be discrete. Where such a construction is used it is advisable to provide means to prevent multiple cavities effectively being formed by spurious reflections. Typically, this will involve providing good quality anti-reflection coatings ($<10^{-3}$ reflectivity) on the QW element.

EXAMPLES OF AFPMS ACCORDING TO THE INVENTION 28 wells of 145–150 Å gave a maximum contrast of 20 dB.

12 wells of 145–150 Å gave a contrast of 5 dB with a bias of 2.08V, and with 3 dB insertion loss.

10 wells of 145–150 Å gave a contrast of 4 dB, with 1.73V bias, and with an insertion loss of 2.55 dB.

15 wells of 150 Å, 60 Å barriers, gave a contrast of 6.7 dB for a bias of 3.2V. The same device had, for contrasts of 4:1, 3:1, and 2:1 (6, 4.8, 3 dB), linewidths of 1.7, 3.4 and 6.0 nm respectively.

These figures are for a 3.5V swing. Insertion loss was slightly more than 3 dB at the optimum wavelength (which in fact gives the worst insertion loss).

Maximum reflection change is 0.38, with a bandwidth of about 5 nm for a 0.30 change.

FIG. 4 shows room temperature reflection, reflection contrast and reflection change (% R) spectra for a 150 Å-well AFPM. Negative voltages indicate reverse bias. The contrast and % R curves are defined as $R(-2.5)/R(+1.0)$ and $R(-2.5)-R(+1.0)$ respectively.

FIG. 6 plots calculated contrast (the on-off ratio in dB), insertion loss (on state reflection relative to unity input in dB) and operating voltage as a function of number of wells for an AFPM with 150 Å wells separated by 60 Å barriers.

AFPMs and SEEDs according to the invention may be grown using MBE or MOVPE. Typically a GaAs substrate is used, but alternatively a silicon substrate may be used. Fabrication of an MQW modulator, comprising a GaAs/AlGaAs MQW, on a silicon substrate is detailed in the paper by Barnes, Whitehead et al, Electronics Letters, Vol. 25, No. 15, pp. 995-996, the contents of which are herein incorporated by this reference.

Devices according to the invention are potentially applicable, particularly in the form of two dimensional arrays, in optical interconnects between integrated circuits. The devices clearly also have applications to optical switching, both in optical computing per se and in telecommunications.

I claim:

1. A Fabry-Perot modulator comprising a resonant cavity defined by front and back reflective surfaces of different reflectivities and including within the cavity a multiple quantum well structure having a barrier width sufficient to prevent resonant coupling between wells in the structure, wherein absorption of the quantum well structure at a resonant wavelength of the cavity and at a low bias level is greater than with a higher bias level, whereby reflectivity of the Fabry-Perot modulator at that wavelength increases with an increase in bias level.

2. A modulator as claimed in claim 1 wherein substantially each of a plurality of barrier layers in said structure are at least 40 Å thick.

3. A modulator as claimed in claim 1 wherein the multiple quantum well structure comprises a plurality of wells having a width of between 130 and 160 Å.

4. A modulator as claimed in claim 3, wherein the well width is at least 140 Å.

5. A modulator as claimed in claim 4, wherein the well width is at least 145 Å.

6. A modulator as claimed in claim 3, wherein the well width is no more than 155 Å.

7. A modulator as claimed in claim 6, wherein the well width is no more than 150 Å.

8. A modulator as claimed in claim 1, wherein the multiple quantum well structure comprises barrier layers having widths of between 40 and 100 Å.

9. A modulator as claimed in claim 8, wherein the barrier width is no more than 70 Å.

10. A modulator as claimed in claim 9 wherein the barrier width is between 45 and 65 Å.

11. A modulator as claimed in claim 1, wherein the multiple quantum well structure comprises GaAs wells and AlGaAs barriers.

12. A modulator as claimed in claim 1, wherein the multiple quantum well structure comprises no more than 30 wells.

13. A modulator as claimed in claim 12, wherein there are between 10 and 30 wells.

14. A self electro-optic device comprising at least one modulator according to claim 1.

15. A device as claimed in claim 14, wherein a load element of the device is grown on a common substrate with said modulator.

16. A device as claimed in claim 15, wherein the load element is a diode grown on top of said modulator.

17. A device as claimed in claim 15, wherein the load element is a second modulator.

18. A method of modulating light, which method comprises directing an optical input at a lower reflectivity facet of a modulator according to claim 1, and applying a modulating electric signal to electrodes of the modulator.

19. A Fabry-Perot modulator comprising a resonant cavity defined by front and back reflective surfaces of different reflectivities and including within the cavity a multiple quantum well structure, the quantum well structure having an excitonic peak wherein the wavelength of an excitonic peak of the quantum well structure in an unbiased state coincides with a resonance of the cavity.

20. A Fabry-Perot modulator comprising a resonant cavity defined by front and back reflective surfaces of different reflectivities, the cavity including a multiple quantum well structure comprised of well regions separated by barriers, wherein the thickness of the barriers is chosen to prevent resonant coupling between the well regions, and wherein the thickness of the well regions and the thickness of the barriers are chosen whereby absorption of the quantum well structure at a resonant wavelength of the cavity and at a low bias level is greater than with a higher bias level, whereby reflectivity of the Fabry-Perot modulator at that wavelength increases with an increase in bias level.

* * * * *